United States Patent
Hsu et al.

(10) Patent No.: US 7,536,202 B2
(45) Date of Patent: May 19, 2009

(54) WIRELESS NETWORK DEVICE WITH A SIGNAL DETECTION FUNCTION AND SWITCHING METHOD FOR THE SAME

(75) Inventors: Jui-Lin Hsu, Hsin-Chu (TW);
Chia-Fang Wu, Hsin-Chu (TW);
Tsung-Ming Yang, Hsin-Chu (TW)

(73) Assignee: Z-Com, Inc., Hsin-Chu (TW)

( * ) Notice: Subject to any disclaimer, the term of this patent is extended or adjusted under 35 U.S.C. 154(b) by 538 days.

(21) Appl. No.: 11/195,710

(22) Filed: Aug. 3, 2005

(65) Prior Publication Data
US 2007/0032272 A1 Feb. 8, 2007

(30) Foreign Application Priority Data
Apr. 26, 2005 (TW) .............................. 94113321 A

(51) Int. Cl.
*H04B 1/38* (2006.01)
(52) U.S. Cl. .................... 455/557; 455/574; 455/67.11; 455/73; 455/344
(58) Field of Classification Search ................. 455/557, 455/574, 67.11, 73, 344; 341/176
See application file for complete search history.

(56) References Cited

U.S. PATENT DOCUMENTS

| | | | |
|---|---|---|---|
| 5,844,517 A * | 12/1998 | Lambropoulos | 341/176 |
| 5,995,041 A * | 11/1999 | Bradley et al. | 342/357.1 |
| 6,269,449 B1 * | 7/2001 | Kocis | 713/310 |
| 6,367,024 B1 * | 4/2002 | Ezell | 713/340 |
| 6,633,583 B1 | 10/2003 | Esterson | 370/466 |
| 6,782,245 B1 | 8/2004 | Lazzarotto et al. | 455/226.1 |
| 7,236,742 B2 * | 6/2007 | Hall et al. | 455/41.3 |
| 7,239,111 B2 * | 7/2007 | Fischer et al. | 320/111 |
| 2006/0035590 A1 * | 2/2006 | Morris et al. | 455/41.2 |
| 2007/0021062 A1 * | 1/2007 | Parikh | 455/13.4 |

OTHER PUBLICATIONS

Parikh, U.S. Appl. No. 60/701,521, filed Jul. 22, 2005.*

* cited by examiner

*Primary Examiner*—Sanh D Phu
(74) *Attorney, Agent, or Firm*—Apex Juris, pllc; Tracy M Heims

(57) ABSTRACT

A wireless network device has a signal detection function and a switching method for the same. A wireless network signal detection module is installed in the wireless network device, and is switched to a wireless network interface card mode or a wireless network signal detection mode after the voltage regulator in the device determines the load voltage. So that the versatile wireless network device is formed to detect the wireless network signal without the PC's help. The steps of switching to the signal detection mode are inclusively detecting the load voltage, switching to the wireless network signal detection mode, scanning the wireless network signal, and finally showing a result in a plurality of manners.

11 Claims, 5 Drawing Sheets

US 7,536,202 B2

WIRELESS NETWORK DEVICE WITH A SIGNAL DETECTION FUNCTION AND SWITCHING METHOD FOR THE SAME

BACKGROUND OF THE INVENTION

1. Field of the Invention

This invention relates to a wireless network device provided with a signal detection function and method of switching for the same, and more particularly to a switching determination with a load voltage of the wireless network device, a versatile networking device detecting signals thereby being formed.

2. Description of Related Art

Thanks to a public wireless network gradually being created everywhere, users have increasing chances to use wireless local area network (WLAN) in public places. Users do not, however, actually carry out wireless networking at all times, everywhere. They must turn on devices provided with a wireless networking function, such as, for example, a PDA or a portable computer, to determine whether a wireless network signal is present through a wireless network utility working with an internal or external wireless network device prior to use of the wireless networking service.

A general external wireless network device, as shown in U.S. Pat. No. 6,633,583, is a wireless communication receiver using a universal serial bus (USB) as an interface, in which a signal conversion circuit is used to convert a wireless signal received from an RF module into a signal based on USB protocol, or convert and transfer a digital signal based on USB protocol to the RF module, and then send out the signal through an antenna.

As shown in FIG. 1, a wireless device connected to a PC host 16 through a USB host interface 14 is disclosed in U.S. Pat. No. 6,782,245. The wireless device is structured with an antenna 11 receiving and transmitting signals and connected to a receiver 12 for converting the signals according to the frequency of received signals into digital signals. The signals are then transmitted to a microcontroller unit 13 for decoding the signals and debugging, and next converting the signals into USB-based signals transmitted to the PC host 16 through the host interface 14. All the above devices are supplied with electric power by a power supply 15.

However, in view of the single function and structure provided in the wireless module and the lack of a full layout of wireless network, it is complicated and inefficient to detect the network signals.

SUMMARY OF THE INVENTION

According to a wireless network device provided with a signal detection function and method of switching for the same, a module used to detect wireless network signals is provided in a wireless network device. The module switches to a wireless network interface card mode or a wireless network signal detection mode at the time of determination of a load voltage so that the versatile wireless network device is formed to detect the wireless network signals. The module can work without any computer system. In a step of switching to the signal detection mode, a wireless network device is first turned on; namely, a load voltage of the wireless network device is detected for switchover of a working mode. For example, in a preferred embodiment, the device switches to a wireless network signal detection mode to scan the wireless network signals and finally gives a result.

The wireless network device for signal detection comprises at least the wireless network communication module, a processor connected to the wireless network communication module, an indication unit connected to the processor and a voltage regulator. And it also has a detection module and a power module connected to a battery, an interface unit, and the voltage regulator.

BRIEF DESCRIPTION OF THE DRAWINGS

The foregoing aspects and many of the attendant advantages of this invention will be more readily appreciated as the same becomes better understood by reference to the following detailed description, when taken in conjunction with the accompanying drawings, wherein.

DETAILED DESCRIPTION OF THE PREFERRED EMBODIMENTS

In this invention, a wireless network device provided with a signal detection function is disclosed. A detection module for detecting wireless signals is provided in addition to the conventional wireless device, and the device is designed with a voltage determination mechanism to switch the device functions according to different load voltage types.

Figure 1:
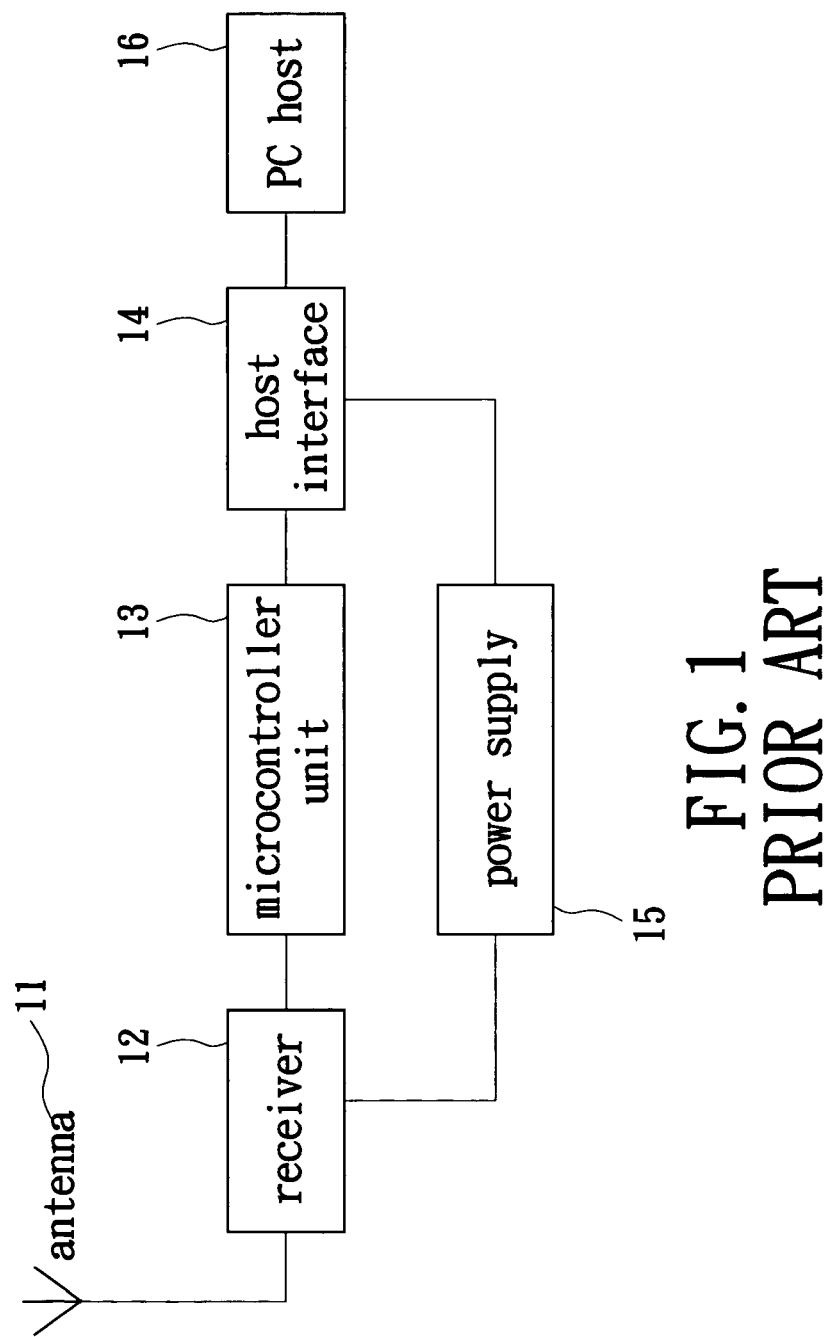
FIG. 1 is a schematic view illustrating a wireless network device of prior art.
Figure 2A:
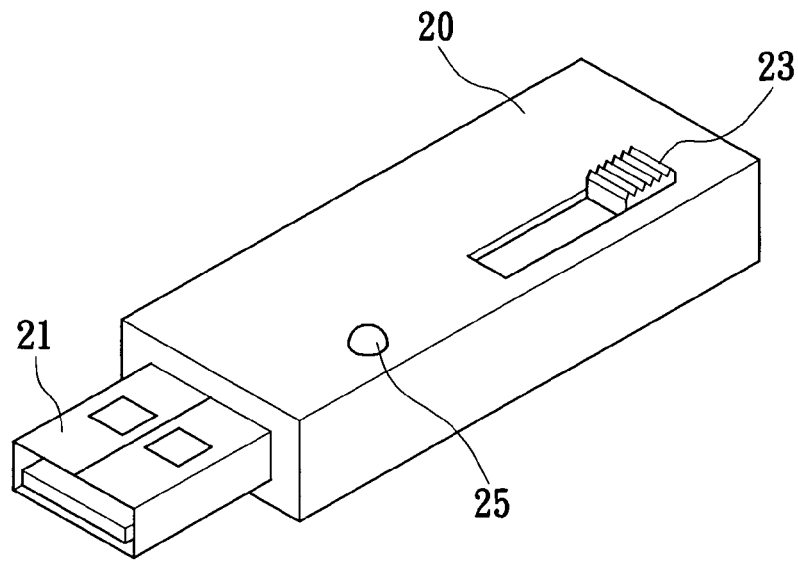
FIG. 2A is a schematic view illustrating a wireless network device according to this invention.

As shown in FIG. 2A, for an embodiment of a wireless network device 20, a conventional wireless USB NIC comprises a network signal detection switch 23 and a status indicating lamp 25 installed therein. When the wireless network device 20 works independently, the switch 23 must be manually switched on with a battery provided internally to detect whether a wireless signal exists in a specified space. The lamp 25 indicates the status of signal; the lamp 25 is not limited to the lamp depicted in the figure and may be replaced with, for example, one or a plurality of LEDs, an LCD, an OLED, or a 7-segment display, as shown in FIG. 1.

Figure 2B:
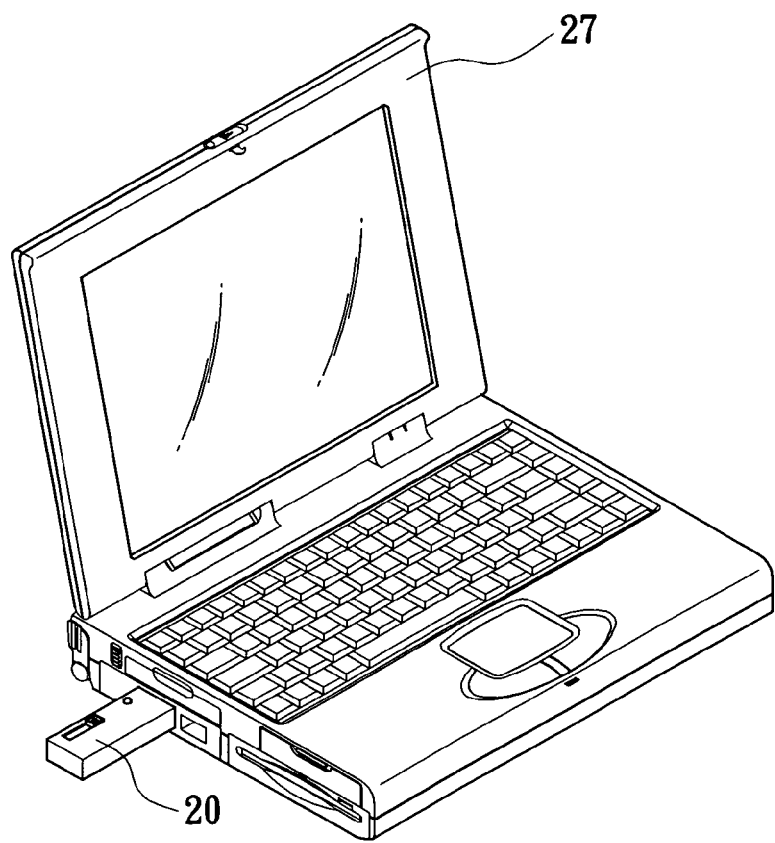
FIG. 2B is a schematic view illustrating application of the wireless network device according to this invention.

When the wireless network device 20 is connected to a PC 27 through a USB interface port 21, as shown in FIG. 2B, the voltage regulator thereof detects a load voltage when the device works independently and then switches to a general wireless NIC mode. The battery power is not consumed in detection of the wireless signal because a wireless network detection software installed in the PC 27 is executed.

Figure 3:
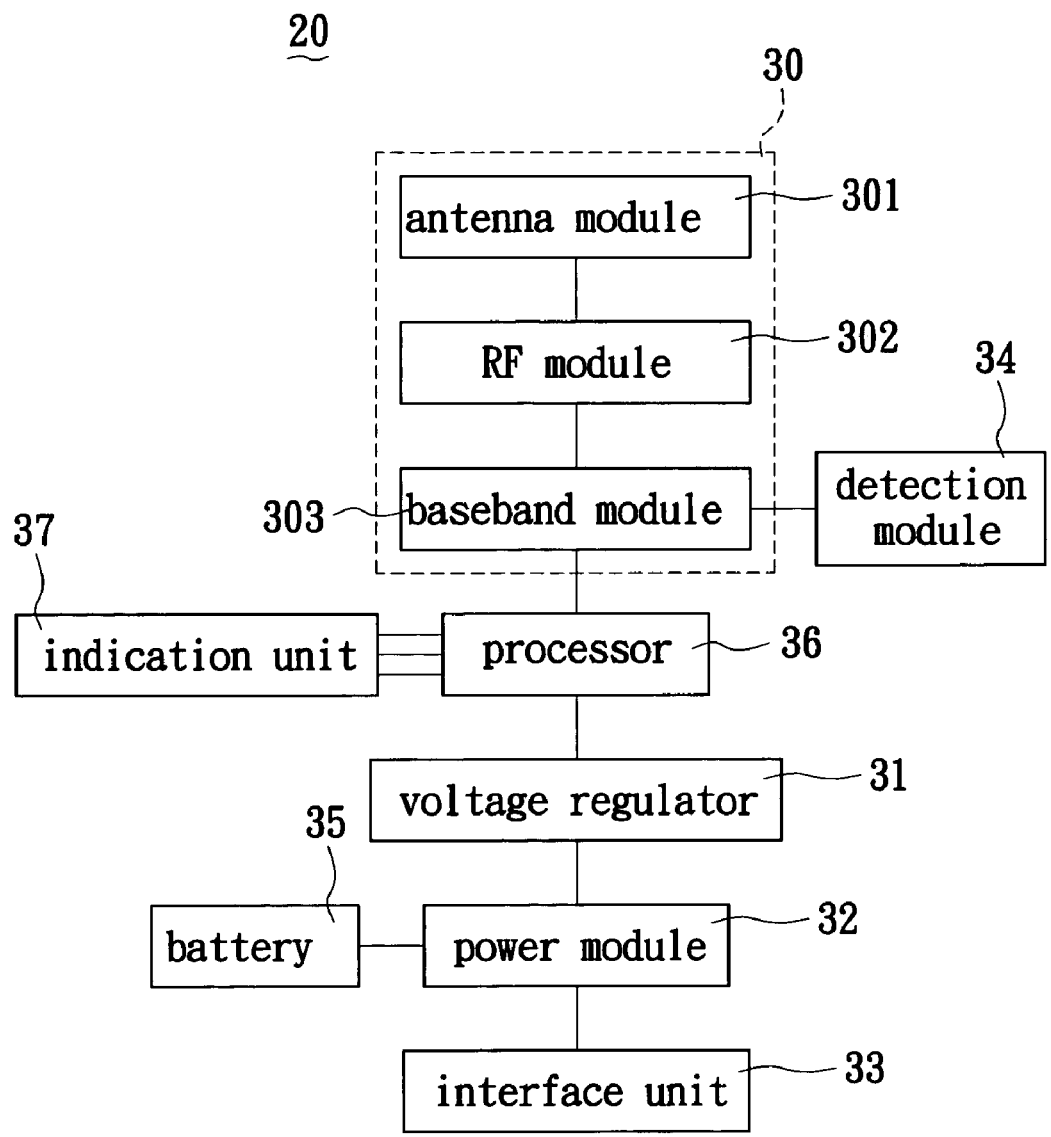
FIG. 3 is a block diagram of the circuit of wireless network device according to this invention.

FIG. 3 is a block diagram of the circuit of the wireless network device provided with a signal detection function according to this invention. As shown in FIG. 2A, a wireless network communication module 30 in the wireless network device 20 that detects the wireless network signal further comprises at least an antenna module 301, an RF module 302, and a baseband module 303. The RF processing and baseband modulation functions are designed in the hardware module, in which the RF module works for frequency synthesis, data conversion, and noise filtering, while the baseband processing works for message coding, encryption and decryption, frequency hop (FH), and packet processing. The antenna module 301 is connected for achievement of wireless communication.

Further, in order to detect the wireless network signal, a detection module 34 is connected to the baseband module 303 in the device according to this invention, and after the antenna module 301 receives the wireless signal, the detection module 34 eliminates background noise and ambient interference accompanying the signal and meanwhile adjusts the detection range to determine the source of the signal.

The wireless network communication module 30 is connected to a processor 36 to convert the wireless signal received by the wireless network communication module 30 into a digital signal and then transmit the same to the PC or transmit the digital signal to the wireless network device 20 from the PC through the interface. The processor 36 then converts the signal into an RF signal and transmits the same from the communication module 30. The processor 36 is further connected to an indication unit 37 to convert the detection result into electric power indicated by the indication unit 37 in the embodiment, such as the indicating lamp in FIG. 2A or an LED, an OLED, or an LCD device. The unit 37 in the embodiment shows the wireless network signal, the strength thereof, or a wireless network identification message thereof. Alternatively, the unit 37 may be implemented in the manner of sound, vibration, or a combination of the manners mentioned above.

The processor 36 is further connected to a voltage regulator 31 connected to a power module to receive the message of load voltage and then determine the functions of switching with the load voltage passing through the device, such as a wireless network mode or a wireless network signal detection mode. The power module 32 is connected to an internal or external battery 35 or an interface unit 33 to manage the power of device, in which the interface unit 33 is a USB, IEEE1394, or PCMCIA (Personal Computer Memory Card International Association) interface to the PC. When the wireless network device 20 according to this invention works independently, the battery 35 is the power source; at this time the voltage regulator 31 determines the load voltage of the device and then switches to the wireless network signal detection mode. When the device is connected to the PC through the interface unit 33, it switches to the wireless NIC mode. At this time the PC supplies electric power. With the switching mechanism, the versatile wireless network device that detects the network signal without the PC's help is achieved.

Figure 4:
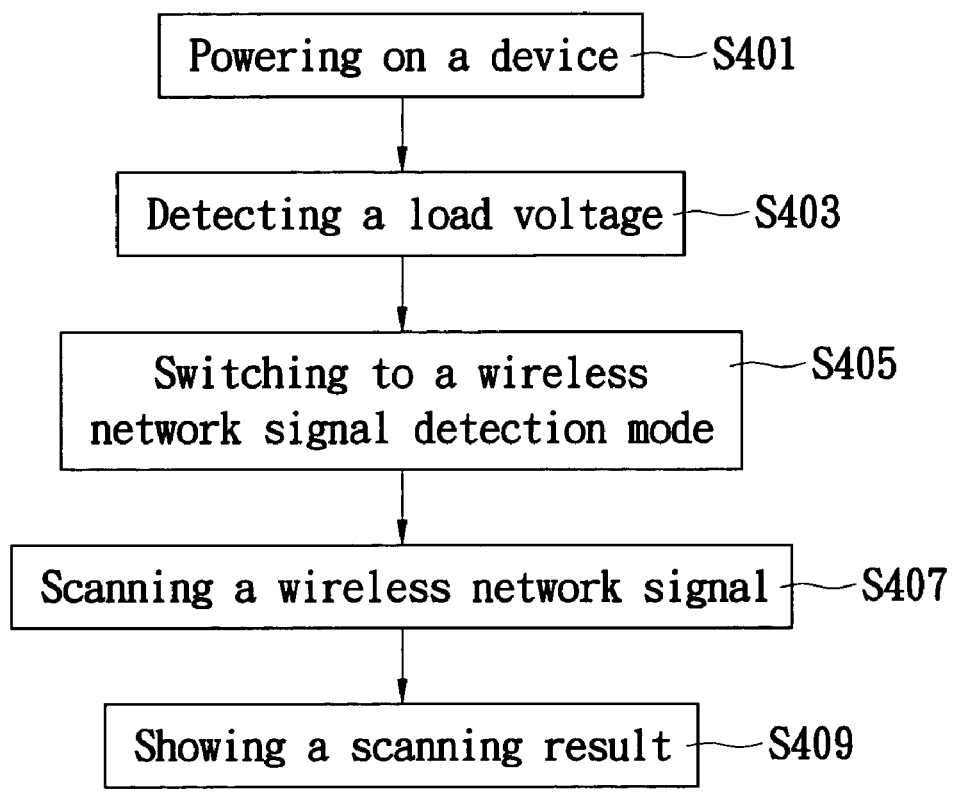
FIG. 4 is a flow chart of a method of switching of the wireless network device functioning to detect signals according to this invention.

After the device is turned on by the switch, the signal indicating device shows the wireless network signal, a strength thereof, or the wireless network identification message. The signal indicating device is, for example, an LED-based indicating lamp or an LCD, or is implemented as a sound, a vibration, or a combination of the implementations mentioned above. FIG. 4 is a flow chart of a method of switching of the wireless network device to detect signals according to this invention. The main steps of the method include the following. The wireless network device according to this invention must be turned on (step S401). The wireless network device may work independently with power supplied by the battery, or may be connected to the PC supplying power thereto. The voltage regulator in the device detects the load voltage of the device (step S403). The voltage varies with the power supply. If, for example, the battery supplies power, the voltage may be 3.3 V, and if the PC supplies the power through the interface, the voltage may be 5 V According to the determination of voltage regulator to the load voltage, the device is switched to the wireless network signal detection mode or the wireless NIC mode (step S405). An example of switching to the wireless network signal detection mode is given in a preferred embodiment of this invention. At the time of entry into the wireless network signal detection mode, a surrounding wireless network signal is scanned and detected by the detection module (step S407). Finally, a scan result is submitted (step S409).

Figure 5:
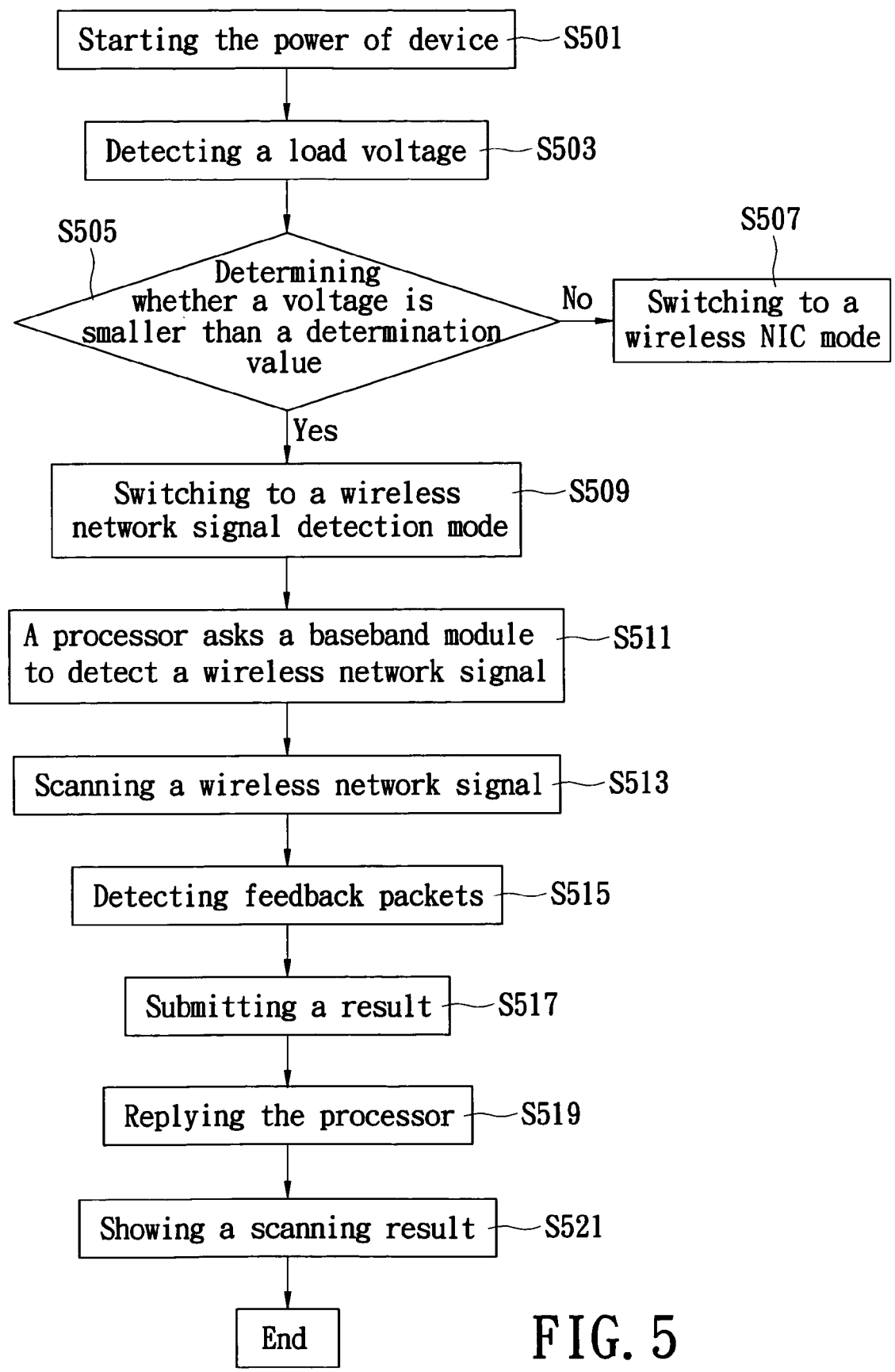
FIG. 5 is a flow chart of a preferred embodiment of this invention.

In a flow chart shown in FIG. 5, the preferred embodiment is described. Initially, the power of wireless network device is provided by the battery or the PC (step S501). Next, the load voltage is detected (step S503). The detected voltage is greater or less than a determination value (step S505). The value is a default load voltage of wireless network device according to this invention, and is classified for a plurality of ranks. Switching to different functional modes is implemented with different load voltage types.

In step S505, if the load voltage is not less than the determination value, switching to the wireless NIC mode is implemented (step S507), and if the load voltage is less than the determination value, switching to the wireless network signal detection mode is implemented (step S509). At this time, the wireless network device is supplied with less voltage by the battery, and works independently to detect the wireless network signal. The scale of voltage, however, is determined mainly by actual operation, so it is not limited by the embodiment.

Next, the processor asks the baseband module to detect the wireless network signal (step S511). The wireless network communication module especially scans the wireless network signal (step S513), and receives feedback packets in a specified time to detect and then determine upon the received signals whether the wireless network signal exists (step S515). A result is submitted (step S517), and the feedback packets sent from the baseband module are returned to the processor to eliminate background noise and ambient interference accompanying the signal and detect the range for determination of the source of the signal and the wireless network signal (step S519). Finally, the processor shows the result on the indication unit to inform a user of the status of wireless network signal (step S521).

The accompanying drawings in the embodiments are provided for reference and illustration only and not intended to limit the terms or scope of this invention.

To sum up, this invention is a wireless network device provided with a signal detection function and method of switching for the same. The device switches the wireless network module upon the load voltage to the general wireless NIC mode or the wireless network signal detection mode for achievement of multiple functions. However, in the description mentioned above, only the preferred embodiments according to this invention are provided without limit to claims of this invention; all those skilled in the art without exception should include the equivalent changes and modifications as falling within the true scope and spirit of the present invention.

What is claimed is:

1. A wireless network device provided with a signal detection function that is equipped with a battery and is selectively connected to a PC, said wireless network device comprising:
   a wireless network communication module for transceiving a wireless network signal;
   a detection module connected to the wireless network communication module;
   a processor connected to the wireless network communication module to convert the wireless network signal received by the network communication module into a digital signal and then transmit the digital signal to the PC, or transmit the digital signal to the wireless network device from the PC;

a power module connected to the battery for selectively receiving a power from the PC or the battery to generate a load voltage according to the source of the received power;

a voltage regulator connected to the processor;

wherein the wireless network device is arranged such that when the power module receives the power only from the battery, the load voltage is less than a determination value, and the voltage regulator switches the device into a wireless network signal detection mode in which the detection module connected detects and scans the wireless network signal;

wherein the device is arranged such that when the power module receives the power from the PC, the load voltage is higher than the determination value, the voltage regulator switches the device into a wireless NIC mode in which the wireless network communication module converts the wireless signal received by the wireless network communication module into a digital signal and then transmit the digital signal to the PC.

2. The wireless network device according to claim 1, further comprising:

a network signal detection switch for starting the wireless network signal detection mode.

3. The wireless network device according claim 1, further comprising:

an indication unit connected to the processor, for showing a detection result of the detection module.

4. The wireless network device according to claim 1, wherein the voltage regulator switches into a wireless NIC mode when the load voltage is not less than a determine value.

5. The wireless network device according to claim 4, further comprising:

a wireless network detection software, which is executed in the wireless NIC mode.

6. The wireless network device according to claim 1, further comprising:

a battery connected to the power module, for supplying the power.

7. The wireless network device according to claim 1, further comprising:

an interface unit connected the power module for supplying the power from a computer to the power module.

8. A method of switching functions of a wireless network device with a signal detection function, comprising steps of:

starting the wireless network device;

receiving a power from a PC or a battery, to generate a load voltage according to the source of the received power; and switching the wireless network device into a wireless network signal detection mode which comprises detecting a feedback packet, receiving the feedback packet, processing the feedback packet to generate a detection result, when receiving the power from the battery to have the load voltage to be less than a determination value;

switching the wireless network device into a wireless NIC mode which comprises converting the wireless signal received into a digital signal and then transmit the digital signal, when receiving the power from the battery to have the load voltage to be higher than the determination value.

9. The method according to claim 8, wherein the step of receiving the power comprising receiving the power comprising receiving the power from one of a battery and a computer.

10. The method according to claim 8, wherein the step of switching into the wireless network signal detection mode further comprises:

detecting a feedback packet;

receiving the feedback packet;

processing the feedback packet to generate a detection result.

11. The method according to claim 8, wherein the step of switching into the wireless NIC mode further comprises:

executing a wireless network detection software.

* * * * *